United States Patent
Gottschalk et al.

(10) Patent No.: US 8,246,060 B2
(45) Date of Patent: Aug. 21, 2012

(54) RESILIENT TIE RODS AND AXLE ASSEMBLIES EMPLOYING SAME

(75) Inventors: Michael J. Gottschalk, Newark, OH (US); Mark W. Dankow, New Albany, OH (US); Scott A. Massa, Blacklick, OH (US); Harold D. Johnson, Alexandria, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 19 days.

(21) Appl. No.: 12/573,570

(22) Filed: Oct. 5, 2009

(65) Prior Publication Data

US 2011/0079459 A1    Apr. 7, 2011

(51) Int. Cl.
*B62D 62/00*    (2006.01)
(52) U.S. Cl. ............ 280/93.51; 280/93.502; 280/93.509
(58) Field of Classification Search ............. 280/93.502, 280/93.509, 93.51, 9.511, 124.107, 124.171, 280/93.511, 93.512
See application file for complete search history.

(56) References Cited

U.S. PATENT DOCUMENTS

| | | | | |
|---|---|---|---|---|
| 1,931,102 A * | 10/1933 | Casper | | 403/133 |
| 3,048,232 A * | 8/1962 | O'Brien | | 180/254 |
| 3,692,324 A * | 9/1972 | Corbin | | 280/124.103 |
| 3,700,059 A * | 10/1972 | Sutton | | 180/209 |
| 4,079,807 A * | 3/1978 | Hornagold et al. | | 180/414 |
| 4,092,078 A * | 5/1978 | Klotz et al. | | 403/221 |
| 4,109,747 A * | 8/1978 | Hornagold et al. | | 180/414 |
| 4,162,859 A * | 7/1979 | McAfee | | 403/75 |
| 4,505,491 A * | 3/1985 | Sano et al. | | 180/409 |
| 4,540,197 A * | 9/1985 | Finn et al. | | 280/6.157 |
| 4,550,932 A * | 11/1985 | Vilain et al. | | 280/124.106 |
| 4,708,363 A * | 11/1987 | Hata | | 280/771 |
| 4,718,686 A * | 1/1988 | Dziuba et al. | | 280/86.757 |
| 4,749,205 A * | 6/1988 | Takahashi et al. | | 280/124.116 |
| 4,813,704 A * | 3/1989 | Smith | | 280/124.109 |
| 4,953,894 A * | 9/1990 | Broszat et al. | | 280/93.511 |
| 5,052,528 A * | 10/1991 | Sullivan | | 188/317 |
| 5,403,031 A | 4/1995 | Gottschalk et al. | | |
| 5,496,055 A * | 3/1996 | Shibahata et al. | | 280/124.141 |
| 5,542,705 A * | 8/1996 | Parker et al. | | 280/124.103 |
| 5,620,194 A | 4/1997 | Keeler et al. | | |
| 5,895,063 A * | 4/1999 | Hasshi et al. | | 280/124.134 |
| 6,530,587 B2 * | 3/2003 | Lawson et al. | | 280/124.17 |
| 7,182,544 B2 * | 2/2007 | Irrer | | 403/43 |
| 7,188,850 B2 * | 3/2007 | Ziech et al. | | 280/93.512 |
| 7,401,677 B2 | 7/2008 | Boyle et al. | | |
| 7,547,028 B1 * | 6/2009 | Blaszynski et al. | | 280/93.51 |
| 7,766,349 B2 * | 8/2010 | Gottschalk | | 280/86.5 |
| 2002/0141813 A1 * | 10/2002 | Davis | | 403/122 |

OTHER PUBLICATIONS

Printout of www.rockcrawler.com webpage regarding the "Alumi-Flex Tie Rod" from Challenger Performance Products, circa 2001.

* cited by examiner

*Primary Examiner* — Joseph Rocca
*Assistant Examiner* — George Spisich
(74) *Attorney, Agent, or Firm* — Cook Alex Ltd.

(57) ABSTRACT

A tie rod for a vehicle axle assembly is constructed using substantially compliant, flexible, and/or resilient material. Such a resilient tie rod may be provided with a rectangular or otherwise non-circular cross-section. Such a resilient tie rod may be used in combination with an axle assembly of the type having an axle and a steering knuckle rotatably associated with each end of the axle. The tie rod may be rotatably or non-rotatably secured to the steering knuckles.

20 Claims, 11 Drawing Sheets

RESILIENT TIE RODS AND AXLE ASSEMBLIES EMPLOYING SAME

BACKGROUND

1. Field of the Disclosure

The present subject matter relates generally to tie rods for vehicles and more particularly to tie rods which are comprised of substantially compliant, flexible, and/or resilient material.

2. Description of Related Art

Forced steering or self-steering axle assemblies for vehicles are well known to include an elongated axle having at each end a steering knuckle. Each steering knuckle is connected to the associated end of the axle by means (typically a king pin) that allows the steering knuckle to rotate with respect to the axle. Each steering knuckle further includes a tie rod arm, with a tie rod extending between the tie rod arms, generally parallel to the associated axle in a resting (straight ahead driving) position. The tie rod is rotatably secured to the tie rod arms, commonly using ball joints, which allows the tie rod to move with the steering knuckles. The tie rod acts as a rigid linkage to cause the steering knuckles to rotate simultaneously and to the same or substantially the same extent as each other.

There are a number of disadvantages associated with known tie rods. For one, rigid tie rods can become bent and damaged if they are caused to strike an obstacle. A damaged tie rod may disrupt the alignment of the steering knuckles, which can lead to tire damage and general degradation of the performance of the vehicle.

Another disadvantage of rigid tie rods is their sub-optimal performance when one wheel (and hence the associated steering knuckle) is subjected to an abrupt input, such as driving over a bump. A rigid tie rod will absorb substantially none of the impact, thus transferring the input to the associated steering knuckle and stressing the interconnections between the tie rod, steering knuckle, and axle. Further, in this situation a rigid tie rod allows for full wheel steer, wherein an impact to one wheel causes that wheel to turn and the tie rod transfers the motion to the other wheel, such that both wheels will turn as the result of a single wheel being subjected to the impact.

Yet another disadvantage of known tie rods is that they are commonly paired with steering knuckles having relatively large and/or elongated tie rod arms, which increases the weight and cost of the axle assembly. The need to periodically lubricate the ball joints connecting the tie rod to the steering knuckles similarly increases the costs to manufacture and maintain the axle assembly.

It has been suggested to replace the rigid tie rod of a steering axle assembly with a compliant, flexible, and/or resilient tie rod. For example, the Alumi-Flex Tie Rod from Challenger Performance Products of Phoenix, Ariz. is a tubular tie rod comprised of a resilient aircraft aluminum material. The resilient material allows the Alumi-Flex Tie Rod to elastically flex upon coming into contact with an obstacle or otherwise being subjected to an impact. According to known design, the Alumi-Flex Tie Rod is rotatably secured to the tie arms of a pair of steering knuckles by ball joints, such that it moves with the steering knuckles without deforming. This adherence to conventional design yields performance results that are in line with rigid tie rods, but fails to take full advantage of the improved performance results that can be achieved by incorporating a resilient tie rod into an axle assembly as described herein.

In view of the foregoing, there is a need for a resilient tie rod that not only resists permanent deformation upon striking an object, but also provides functional advantages that are not otherwise possible with rigid tie rods. There is also a need for a tie rod that decreases the weight and cost of the associated axle assembly.

SUMMARY

There are several aspects of the present subject matter which may be embodied in the devices and systems described and claimed below. These aspects may be employed alone or in combination with other aspects of the subject matter described herein.

In one aspect, a tie rod is provided for use in a vehicle axle assembly. The vehicle axle assembly is of the type having an axle with first and second ends and a pair of steering knuckles rotatably associated with the first and second ends. The tie rod is adapted to be secured to the steering knuckles, is comprised of a substantially resilient material, and has a non-circular cross-section.

In another separate aspect, an axle assembly for a vehicle comprises an axle, two steering knuckles, and a tie rod. The axle has first and second ends, with a steering knuckle rotatably associated with each of the first and second ends of the axle. The tie rod extends between and is non-rotatably secured to the steering knuckles.

In yet another separate aspect, an axle assembly for a vehicle comprises an axle, two steering knuckles, two connectors, and a tie rod. The axle has first and second ends, with a steering knuckle rotatably associated with each of the first and second ends of the axle. Each connector is at least partially comprised of a resilient material and associated with one of the steering knuckles. The tie rod extends between the connectors and is comprised of a substantially resilient material.

In another separate aspect, a tie rod is provided for use in a vehicle axle assembly. The vehicle axle assembly is of the type having an axle with a pair of steering knuckles rotatably associated with its ends. The tie rod is adapted to be secured to the steering knuckles and has a generally linear portion with a non-circular cross-section and first and second regions which are inclined with respect to each other.

In yet another separate aspect, an axle assembly for a vehicle comprises an axle, two steering knuckles, and a tie rod. The axle has first and second ends, with a first steering knuckle rotatably associated with the first end of the axle and a second steering knuckle rotatably associated with the second end of the axle. The tie rod extends between the steering knuckles, has a non-circular cross-section, and is oriented in an inclined configuration which is inclined with respect to a vertical direction and a horizontal direction.

BRIEF DESCRIPTION OF THE DRAWINGS

In the following detailed description, reference will frequently be made to the following views of the drawing, in which like reference numerals refer to like components, and in which.

DESCRIPTION OF SEVERAL EMBODIMENTS

The embodiments disclosed herein are for the purpose of providing the required description of the present subject matter. These embodiments are only exemplary, and may be embodied in various forms. Therefore, specific details disclosed herein are not to be interpreted as limiting the subject matter as defined in the accompanying claims.

Figures 1, 4, 5, 6, 7:
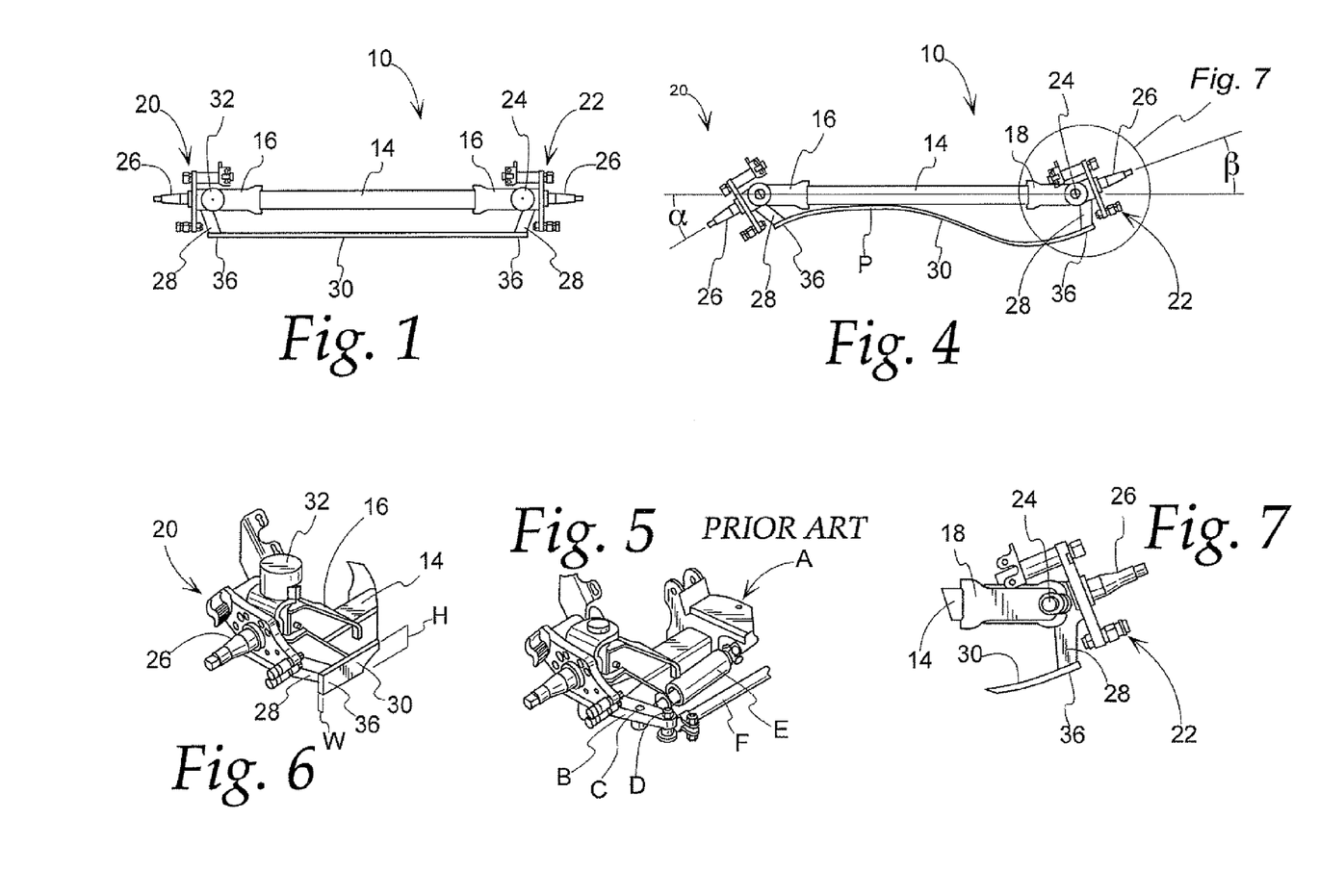
FIG. 1 is a top plan view of a steering axle assembly of a vehicle constructed in accordance with the principles and teachings set forth herein, with steering knuckles of the axle assembly in a centered or non-rotated configuration.
FIG. 4 is a top plan view of the axle assembly of FIG. 1, with the steering knuckles of the axle assembly in a rotated configuration.
FIG. 5 is a perspective view of one end of a prior art axle assembly.
FIG. 6 is a perspective view of one of the steering knuckles of the axle assembly of FIG. 1.
FIG. 7 is a detail view of one of the steering knuckles of the axle assembly of FIG. 4.
Figure 2:
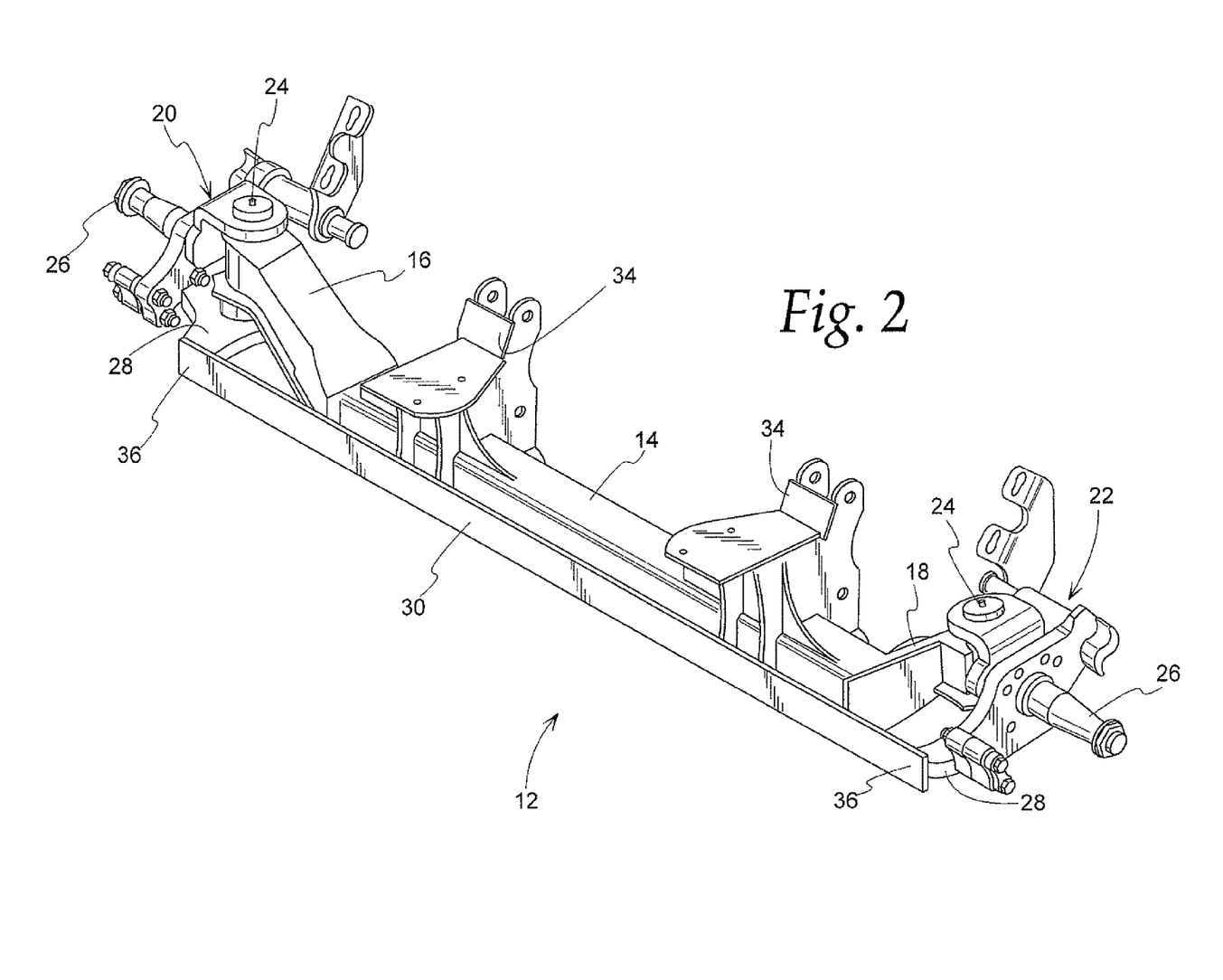
FIG. 2 is a top perspective view of a self-steering axle assembly of a vehicle constructed in accordance with the principles and teachings set forth herein, with steering knuckles of the axle assembly in a centered or non-rotated configuration.
Figure 3:
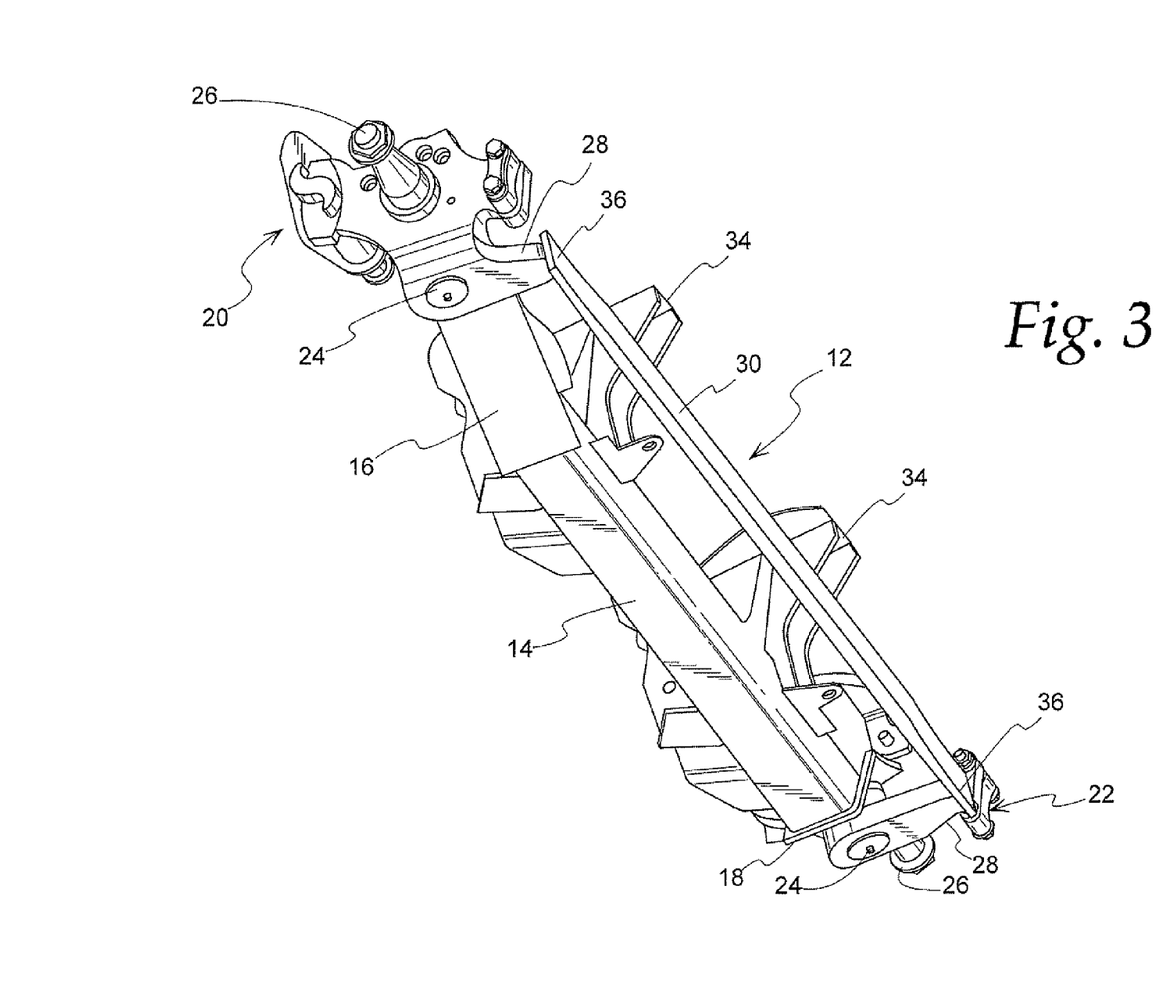
FIG. 3 is a bottom perspective view of the self-steering axle assembly of FIG. 2.

FIG. 1 illustrates a steering axle assembly generally indicated by reference numeral 10. FIGS. 2 and 3 illustrate a similar self-steering axle assembly generally indicated by reference numeral 12. Tie rods according to the present disclosure are particularly well-suited for use in passive or self-steering axle assemblies (FIGS. 2 and 3) but, as shown in FIG. 1, may also be incorporated into forced steering axle assemblies and the term "axle assembly," as used herein, refers generally to any assembly employing an axle with steering knuckles rotatably secured thereto, unless otherwise indicated.

The axle assemblies 10 and 12 include an axle 14 having a first end 16 and a second end 18. A first steering knuckle 20 is rotatably associated with the first end 16 of the axle 14, while a second steering knuckle 22 is rotatably associated with the second end 18 of the axle 14. The steering knuckles 20 and 22 are shown in FIGS. 1-3 as being connected to the axle 14 by king pins 24, according to conventional design, but the steering knuckles 20 and 22 may be otherwise rotatably secured to the axle 14 by any suitable means without departing from the scope of the present disclosure. FIGS. 1-3 illustrate the steering knuckles 20 and 22 in a centered or non-rotated configuration for straight ahead driving, while FIG. 4 illustrates the steering knuckles 20 and 22 in a particular rotated configuration for turning, but it will be understood that other rotated configurations may also be achieved by the steering knuckles 20 and 22.

Each steering knuckle 20, 22 includes a spindle 26 for mounting a ground-engaging wheel (not illustrated) according to known design.

Each steering knuckle 20, 22 further includes a tie rod arm 28 to which is secured a tie rod 30. The illustrated tie rod arms 28 are shorter and, hence, lighter than typical tie rod arms. For contrast, FIG. 5 illustrates one end of a prior art self-steering axle assembly A. The tie rod arm B shown in FIG. 5 is relatively elongated to accommodate two apertures C and D, the first aperture C accommodating a pivot for a linear steering damper E and the second aperture D accommodating a pivot for a tie rod F. The tie rod arms 28 illustrated in FIG. 1 are relatively short because they may be provided without the two apertures C and D of the known tie rod arm B. In particular, the first aperture C may be omitted by replacing the linear steering damper E with a rotary steering damper 32 (FIGS. 1 and 6), which is mounted atop the first steering knuckle 20, rather than being pivotally secured to the tie rod arm 28. Rotary steering dampers are described in greater detail in U.S. Pat. No. 7,360,773, the entire disclosure of which is hereby incorporated herein by reference. As for the second aperture D of the known tie rod arm B, it may be omitted by non-rotatably securing the tie rod 30 to the tie rod arm 28, as shown in FIGS. 1-4, 6, and 7, and as will be described in greater detail herein.

The self-steering axle assembly 12 of FIGS. 2 and 3 is similar to the steering axle assembly 10 of FIG. 1, except for the omission of a steering damper (which may be employed with the self-steering axle assembly 12) and the inclusion of a pair of axle seat brackets 34. The axle seat brackets 34 provide support platforms for a pair of vertical air ride springs (not illustrated) and are themselves secured to beams of a parallelogram-type lift assembly (not illustrated), according to known design. A more thorough discussion of self-steering axle assemblies and the associated lift assemblies can be found in U.S. Pat. Nos. 5,403,031 and 5,620,194, the entire disclosures of both of which are hereby incorporated herein by reference.

Turning now to the tie rod 30, it extends between and is secured to the tie rod arms 28 of the steering knuckles 20 and 22, providing a linkage between the steering knuckles 20 and 22. In one aspect of the present disclosure, the tie rod 30 may be comprised of a substantially resilient material. As used herein, the term "resilient" refers to a material that is compliant or flexible or otherwise capable of more elastic deformation than known rigid tie rods and is used interchangeably herein with the terms "non-rigid," "compliant," and "flexible."

By way of example, in one embodiment, the tie rod 30 is sufficiently resilient that it bends into a generally "S-shaped" configuration (FIGS. 4 and 7) during normal use, before returning to its original linear configuration (FIG. 1). A number of factors are involved in this phenomenon. First, the tie rod 30 is comprised of a non-rigid material. Suitable materials for the tie rod 30 include, but are not limited to aircraft grade aluminum material, spring steel material, and composite spring material. Second, the tie rod 30 is non-rotatably secured or affixed or hard-mounted to the tie rod arms 28 at or adjacent to its ends 36. This may done by any of a number of means, such as a welding operation or through the use of mechanical fasteners, such as bolts or the like. By foregoing the use of traditional rotatable connections between the tie rod and tie rod arms (e.g., ball joints), the tie rod, when acted upon by a rotating tie rod arm, will be bent toward or away from the axle, rather than pivoting to remain substantially linear. Third, the tie rod 30 may be provided with a non-circular cross-section, which can be seen in FIGS. 2, 3, and 6. In the illustrated embodiment, the tie rod 30 has a substantially rectangular cross-section, with a height H that is greater than its width W (FIG. 6). Typical tie rods have a circular cross-section, which results in uniform bending strength in all directions when compressed, thereby minimizing the risk that the tie rod will bend or otherwise deform during use. On the other hand, employing a rectangular cross-section gives the tie rod different bending strengths in different directions, with the illustrated configuration causing the tie rod 30 to tend to bend about a vertical axis, for example, into the "S-shaped" configuration of FIG. 4.

The resilient tie rod, being bent into the "S-shaped" configuration of FIG. 4 or any other deformed state, will resist such deformation and provide a reactive force tending to return the tie rod to its original undeformed, least stressed configuration (FIG. 1). When the tie rod 30 is in its original undeformed, least stressed configuration, the steering knuckles 20 and 22 and, hence, the associated wheels are in a centered or non-rotated configuration. Hence, it will be seen that a tie rod according to the present disclosure biases the steering knuckles 20 and 22 to a non-rotated configuration, thereby providing a self-centering function that is not achieved by known tie rods.

Another phenomenon resulting from non-rotatably securing a resilient tie rod to the tie rod arms is the fact that the lateral extent of the tie rod does not remain constant. In particular, the lateral extent (i.e., the left-to-right distance between the ends of the tie rod) is at a maximum in the configuration of FIG. 1 and decreases as the tie rod bends from its original undeformed, least stressed configuration. It will be understood that the lateral extent of the tie rod is equal to the separation between the tie rod arms, meaning that the separation between the tie rod arms is also variable. Changing the separation between the tie rod arms moves them and, hence, the steering knuckles out of alignment with each other, as in FIG. 4, wherein the first steering knuckle 20 is positioned at an angle α approximately 31° from center and the second steering knuckle 22 is positioned at an angle β approximately 21° from center. When employing a rigid tie rod, the separation between the tie rod arms tends to remain substantially constant, thereby maintaining the steering knuckles in alignment with each other unless a separate component, such as an adjusting sleeve, is employed in combination with the tie rod. Those skilled in the art will understand that moving the steering knuckles out of alignment with each other may be advantageous, for example, by moving the steering knuckles into an optimized Ackerman steering configuration, wherein the inner and outer steering knuckles are at different angles from center to account for the different turning radii of the associated wheels when the vehicle corners. Thus, it will be appreciated that tie rods according to the present invention allow for a variable alignment angle without requiring the use of a second component, such as an adjusting sleeve, in combination with the tie rod.

Yet another phenomenon resulting from securing a resilient tie rod to the tie rod arms by means that prevent or at least restrict relative rotation therebetween is the fact that the tie rod 30 may be sufficiently flexible to move into contact with the axle 14 (FIG. 4) at a contact point or location generally designated as P. A tie rod that is sufficiently flexible to come into contact with the axle is not required, but if so provided, the fact that the tie rod 30 comes into contact with the axle 14 upon sufficient rotation of at least one of the steering knuckles may be used to achieve various functional advantages. For example, the tie rod may be designed such that it forces the steering knuckles into an optimized Ackerman steering configuration or a substantially optimized Ackerman steering configuration when the tie rod contacts the axle, as in FIG. 4. Additionally, if the tie rod is sufficiently flexible to come into contact with the axle during use, this contact between the tie rod and the axle may be used to limit the turning radius of the steering knuckles, similar to the way that it is known to limit the turning radius of steering knuckles by designing the steering knuckle to come into contact with the axle.

Figure 8:
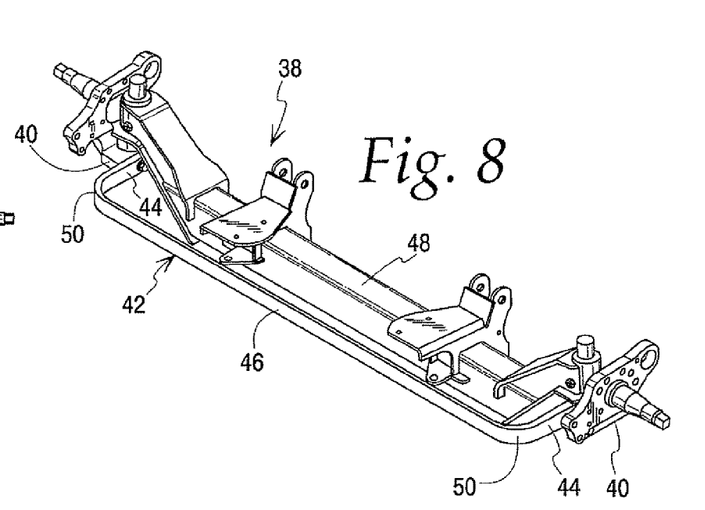
FIG. 8 is a top perspective view of an alternative steering axle assembly, with the steering knuckles of the axle assembly in a centered or non-rotated configuration.
Figure 9:
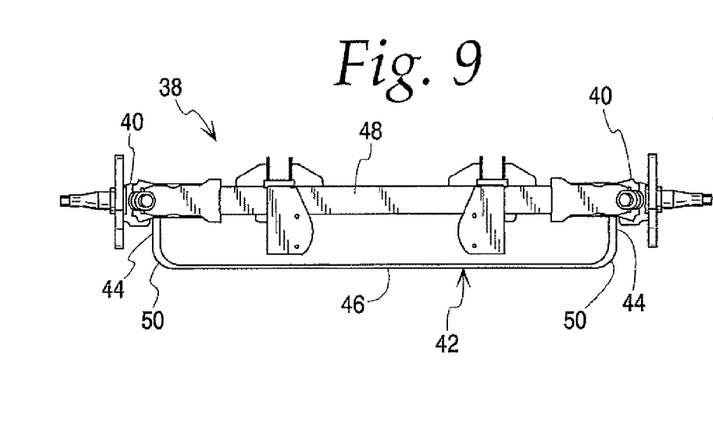
FIG. 9 is a top plan view of the axle assembly of FIG. 8.
Figure 10:
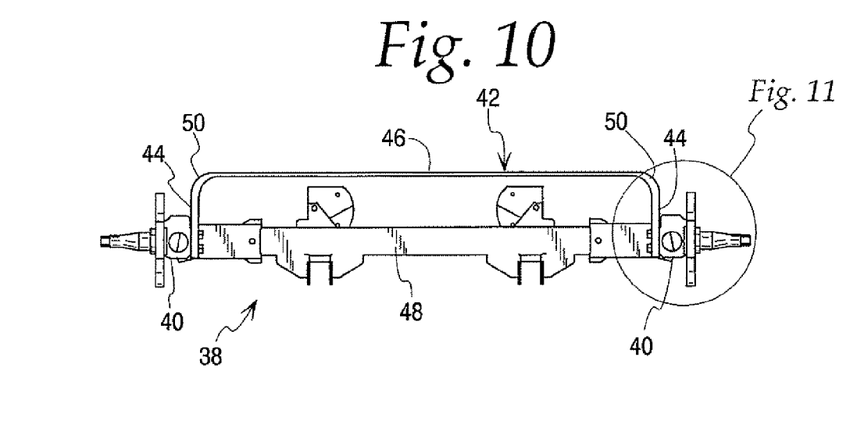
FIG. 10 is a bottom plan view of the axle assembly of FIG. 8.

FIGS. 8-10 illustrate a steering axle assembly 38 incorporating alternative steering knuckles 40 and an alternative tie rod 42. The steering knuckles 40 differ from those in FIGS. 1-5 and 7 because they are provided without tie rod arms. It will be appreciated that steering knuckles omitting tie rod arms will be lighter and less expensive than typical steering axle assembly steering knuckles.

In typical steering knuckles, the rearwardly extending tie rod arms serve as attachment locations for the ends of a tie rod, while spacing the tie rod a suitable distance away from the axle. Accordingly, when dealing with steering knuckles lacking tie rod arms, some other structure is needed to perform the functions of the tie rod arms. In the embodiment of FIGS. 8-10, the tie rod 42 is generally "U-shaped" when viewed from above (FIG. 9) or below (FIG. 10), with a pair of longitudinally extending sections 44 which serve the same functions as the tie rod arms, i.e., providing means for connecting the tie rod 42 to the steering knuckles 40 while adequately spacing a central section 46 of the tie rod 42 from the axle 48.

More particularly, the tie rod 42 of FIGS. 8-10 is provided with a straight central section 46 bounded on each end by the longitudinally extending sections 44. The transition between the central section 46 and the longitudinally extending sections 44 is provided by first and second curved sections 50, with the longitudinally extending sections 44 being laterally outward of the curved sections 50. The tie rod 42 may be formed by providing a straight metal bar generally according to the foregoing description of the tie rod 30 of FIGS. 1-5 and 7 and bending it adjacent to its ends to form the illustrated first and second curved sections 50. In one embodiment, the radius of curvature of the first and second curved sections 50 is approximately two inches, but other radii of curvature may also be employed without departing from the scope of the present disclosure.

Figure 11:
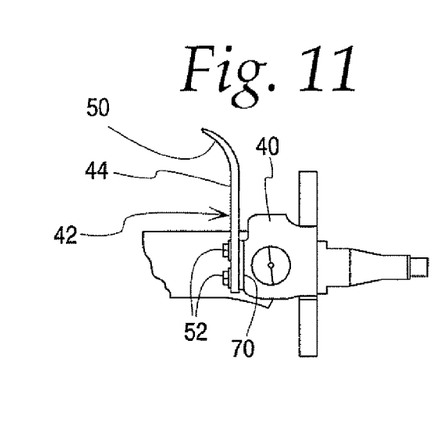
FIG. 11 is a detail view of one of the steering knuckles of the axle assembly of FIG. 10.

The longitudinally extending sections 44 of the tie rod 42 are directly secured to the steering knuckles 40, as best shown in FIGS. 10 and 11. FIG. 11 shows a longitudinally extending section 44 being secured to the associated steering knuckle 40 by mechanical fasteners 52, such as bolts. However, the longitudinally extending sections 44 may be otherwise secured to the steering knuckles 40, for example by welds, without departing from the scope of the present disclosure.

Figure 12:
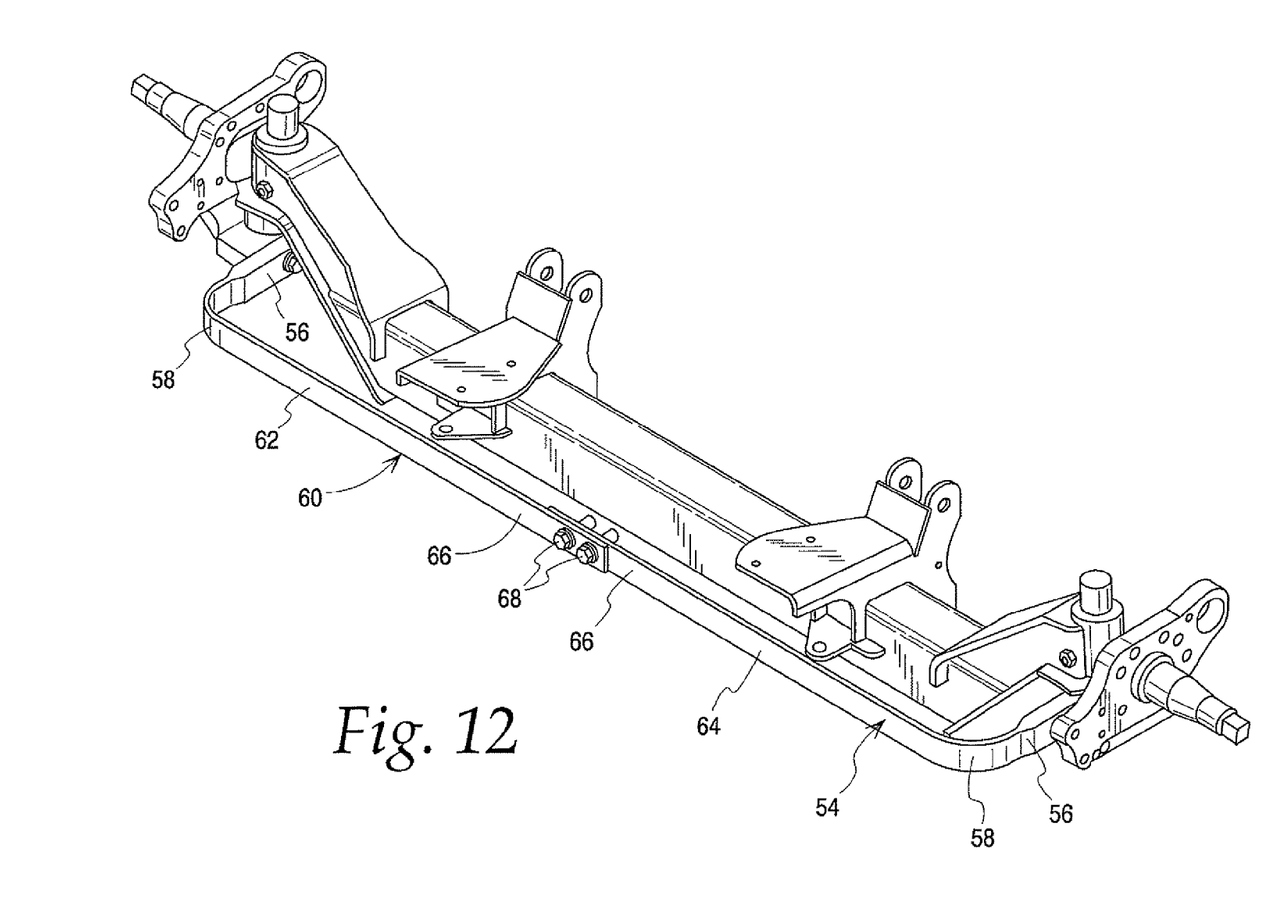
FIG. 12 is a top perspective view of another alternative steering axle assembly.
Figure 13:
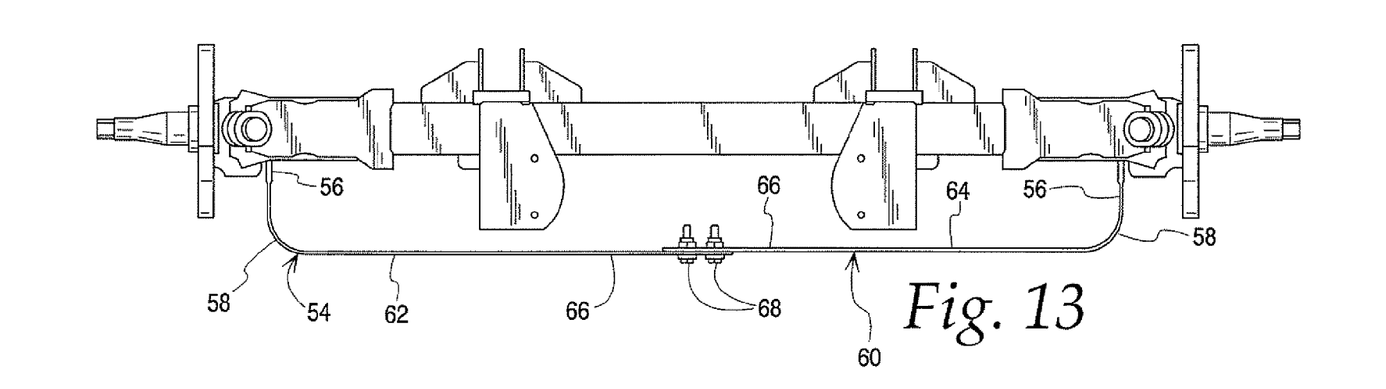
FIG. 13 is a top plan view of the axle assembly of FIG. 12.

To ensure that the connection between the tie rod 42 and the steering knuckles 40 is secure and strong, it may be advantageous for the longitudinally extending sections 44 to have a relatively large cross-sectional area when compared to the remainder of the tie rod 42. As shown in FIGS. 8-10, all or a portion of the longitudinally extending sections 44 may have a greater cross-sectional area than the central section 46, which may be advantageous to ensure that the central section 46 of the tie rod 42 remains relatively compliant and flexible. In the embodiment of FIGS. 8-10, the thickened portion of the tie rod 42 includes the entirety of the longitudinally extending sections 44, while the curved sections 50 are tapered to transition between the relatively thick longitudinally extending sections 44 and the relatively thin central section 46. Other tie rod profiles may also be employed without departing from the scope of the present disclosure. For example, FIGS. 12 and 13 illustrate a tie rod 54 having smaller thickened portions that are confined to the ends of the longitudinally extending sections 56, with the tapers being located in the longitudinally extending sections 56 instead of the curved sections 58. By employing smaller thickened portions, the central section 60 and curved sections 58 are more flexible, as may be desirable in certain applications. Other variations to the profile of the tie rod may be employed to achieve different performance characteristics.

The tie rod may be provided as a single piece (FIGS. 8-10) or may be comprised of multiple pieces that are secured to each other, as in FIGS. 12 and 13. In FIGS. 12 and 13, the tie rod 54 is comprised of first and second pieces 62 and 64 that are substantially identical to each other, each extending from a longitudinally extending section 56 to a free end 66, with a curved section 58 therebetween. The illustrated first and second pieces 62 and 64 are secured to each other at or adjacent to their free ends 66 by mechanical fasteners 68, such as bolts, although other means may also be used to secure the first and second pieces 62 and 64 to each other. The length of the composite straight central section 60 (i.e., the portion of the tie rod 54 between the curved sections 58) may be varied by adjusting the amount of overlap of the free ends 66 of the first and second pieces 62 and 64.

Figure 14:
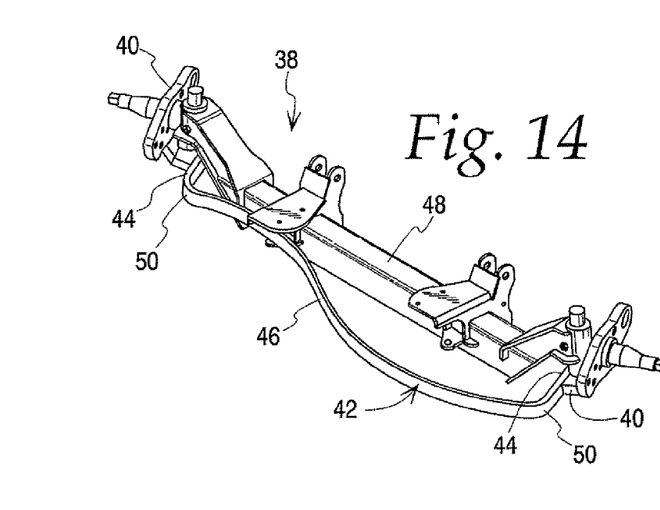
FIG. 14 is a top perspective view of the axle assembly of FIG. 8, with the steering knuckles of the axle assembly in a rotated configuration.
Figure 15:
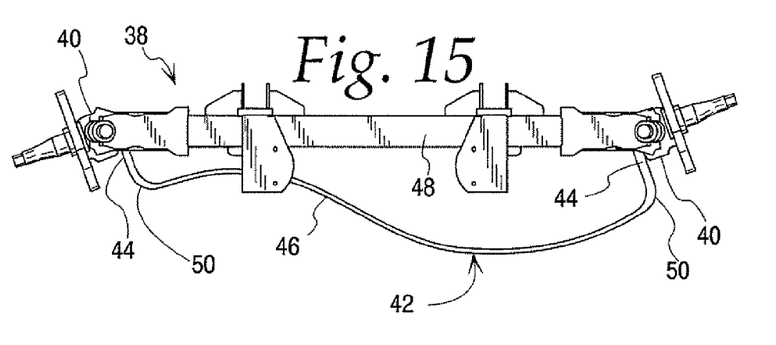
FIG. 15 is a top plan view of the axle assembly of FIG. 8, with the steering knuckles of the axle assembly in a rotated configuration.

Regardless of whether the tie rod is provided with a unitary or multiple-piece configuration, it is advantageously compliant or flexible, according to the foregoing description of the tie rod 30 of FIGS. 1-5 and 7. FIGS. 14 and 15 show the single-piece tie rod 42 of FIGS. 8-10 being sufficiently resilient that it bends into a generally "S-shaped" configuration when the steering knuckles 40 are in a rotated or non-centered condition. Such an "S-shaped" configuration may be encouraged by providing the tie rod 42 with a non-circular cross-section, in accordance with the foregoing description of the configuration of the tie rod 30 of FIGS. 1-5 and 7.

Those skilled in the art will appreciate that the configuration of the curved sections and the longitudinally extending sections of the tie rod factor into the toe angle of the steering knuckles. For example, in the illustrated embodiments of FIGS. 8-13, the longitudinally extending sections are substantially perpendicular to the central section of the tie rod, with each curved sections defining a 90° arc. If such a configuration is employed, the tires will tend to be substantially aligned with each other. Alternatively, the tires may be placed in "toe-out" relation to each other by providing curved sections which each define an arc that is greater than 90°, with the longitudinally extending sections being angled outwardly from the longitudinal direction.

Other methods may also be employed to adjust the toe angle of the steering knuckles. For example, FIG. 11 illustrates a shim or spacer 70 positioned between a longitudinally extending section 44 of the tie rod 42 and the associated steering knuckle 40, which serves to increase the toe angle. This approach may be employed with either a single- or multiple-piece tie rod. On the other hand, if a multiple-piece tie rod is employed (as in FIGS. 12 and 13), the toe angle may be adjusted by varying the amount of overlap between the free ends of the pieces, which controls the effective length of the composite straight central section. Decreasing the length of the composite straight central section of the tie rod (by increasing the amount of overlap between the free ends) will tend to increase the toe angle, while increasing the length of the composite straight central section of the tie rod (by decreasing the amount of overlap between the free ends) will tend to decrease the toe angle.

Figure 16:
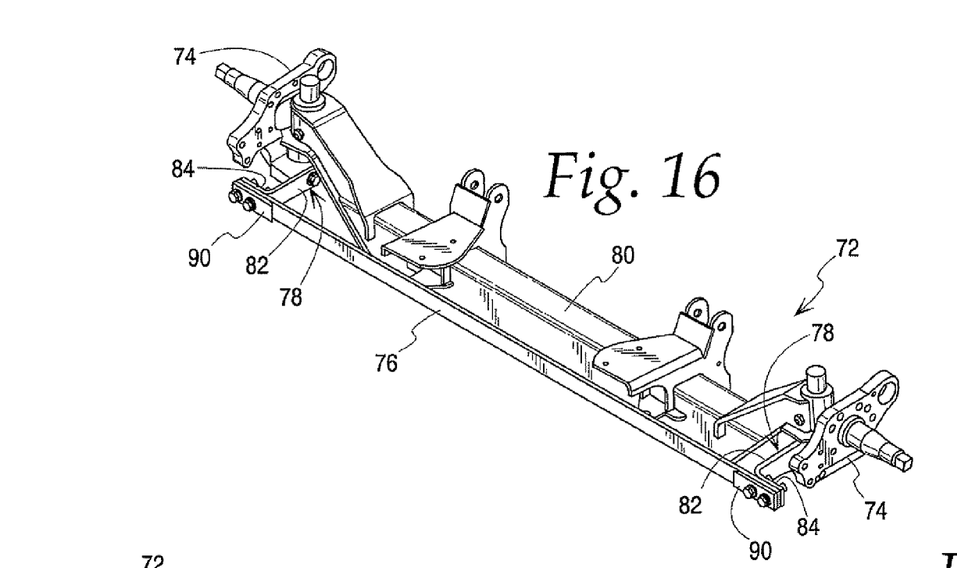
FIG. 16 is a top perspective view of yet another alternative steering axle assembly.
Figure 17:
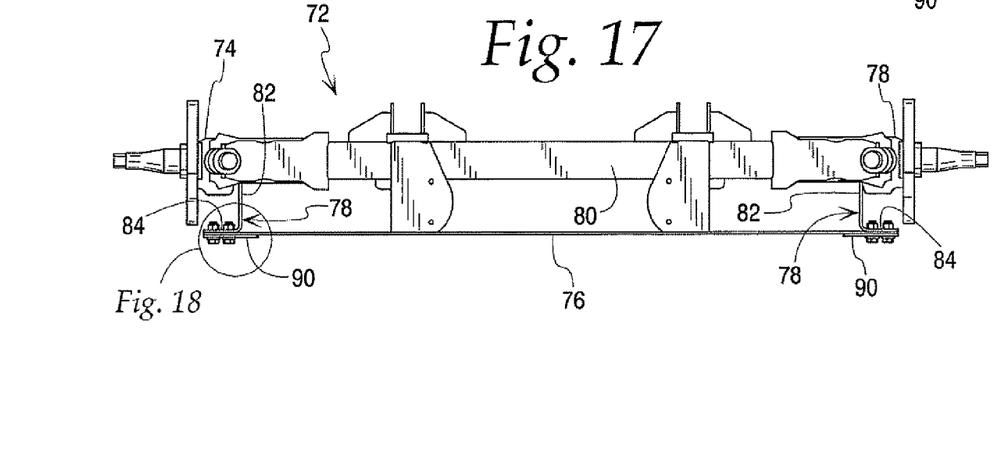
FIG. 17 is a top plan view of the axle assembly of FIG. 16.
Figure 18:
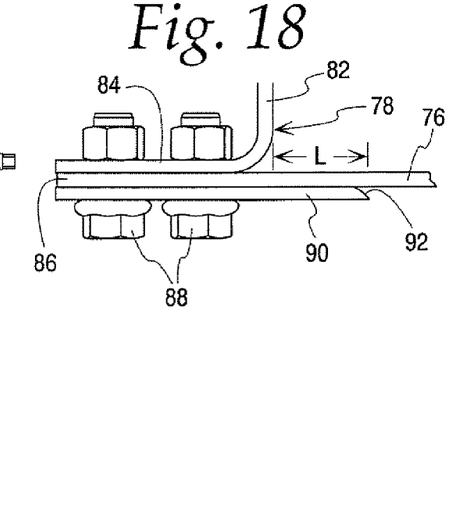
FIG. 18 is a detail view of one end of the tie rod of the axle assembly of FIG. 17.

FIGS. 16 and 17 illustrate another steering axle assembly 72 employing steering knuckles 74 that lack tie rod arms. In the embodiment of FIGS. 16 and 17, the tie rod 76 is provided generally according to the foregoing description of the compliant tie rod 30 of FIGS. 1-5 and 7. A pair of metal brackets 78 are provided to perform the functions of tie rod arms, i.e., providing means for connecting the tie rod 76 to the steering knuckles 74 while adequately spacing the tie rod 76 from the axle 80. The illustrated brackets 78 are substantially L-shaped, each having a longitudinal leg 82 and a lateral leg 84, as best shown in FIG. 18. Each longitudinal leg 82 is secured to one of the steering knuckles 74 by suitable means. For example, each longitudinal bracket leg 82 may be secured to the associated steering knuckle 74 by mechanical fasteners, such as bolts. However, the longitudinal legs 82 may be otherwise secured to the steering knuckles 74, for example by welds, without departing from the scope of the present disclosure.

As for the lateral legs 84 of the brackets 78, they extend outwardly away from each other and are secured to the tie rod 76 at or adjacent to the ends 86 of the tie rod 76, as shown in greater detail in FIG. 18. In the illustrated embodiment, the lateral legs 84 are secured to the tie rod 76 by mechanical fasteners 88, such as bolts, but other fastening means may also be employed without departing from the scope of the present disclosure.

It may be advantageous for the brackets 78 to be relatively thick (compared to the thickness of the tie rod 76) to ensure that the connection between the tie rod 76 and the steering knuckles 74 is secure and strong. On the other hand, a degree of resiliency may also be advantageous for the brackets 78 to retain some flexibility or compliance for improved performance of the steering axle assembly 72. Different applications require different performance characteristics, so the thickness or resiliency of the brackets 78 may be selected according to the expected use of the steering axle assembly 72. Alternatively, rather than varying the thickness of the brackets 78, the same effect may be achieved by providing brackets 78 comprised of a material that is semi-rigid or otherwise less compliant than the material used to form the tie rod 76.

As best illustrated in FIG. 18, the tie rod 76 is sandwiched between the lateral leg 84 of one of the brackets 78 and a deflection modifying member or plate 90 at or adjacent to each of its ends 86. The deflection modifying members 90 are provided as flat metal bars or plates that are secured at or adjacent to the ends 86 of the tie rod 76. The tie rod 76 is compliant and adapted to bend during use, so the illustrated "sandwich" configuration serves to transfer strain from an end 86 of the tie rod 76 to the associated bracket 78 and/or deflection modifying member 90 when the tie rod 76 bends during use. This prevents fully reversed bending of the tie rod 76 and decreases the wear typically experienced by the tie rod 76 as a result of repeated bending, thereby increasing the durability of the tie rod 76.

In the illustrated embodiment, the deflection modifying members 90 extend a selected distance L more laterally inwardly (i.e., toward the center of the tie rod 76) than the associated bracket 78 (FIG. 18). Increasing the distance L is beneficial because it has the effect of providing additional strain transfer, but doing so also has the effect of decreasing the effective flexibility of the tie rod 76. Accordingly, the distance L may be selected according to the expected use of the steering axle assembly 72, depending on whether there is more need for durability or flexibility.

An additional benefit of providing deflection modifying members 90 that extend more or less laterally inwardly than the associated bracket 78 is that they effectively create different bending points depending on the direction in which the tie rod 76 is bending. In particular, when the end 86 of the tie rod 76 is bending toward the associated bracket 78, the tie rod 76 will bend about the innermost end of the bracket 78, while it will bend about the innermost end 92 of the associated deflection modifying member 90 when the end 86 of the tie rod 76 is bending away from the associated bracket 78. Separating these two bending points increases the durability of the tie rod 76 because the metal fatigue caused by bending will be shared by two different locations, rather than being focused at a single location for both bending situations.

Additionally, the deflection modifying members 90 of FIGS. 16-18 are illustrated with an innermost end 92 that is beveled or rounded. This may be preferred to an innermost end that presents a sharp edge to the tie rod 76, as it reduces the amount of wear experienced by the tie rod 76 due to metal-to-metal contact during use. Other means for reducing the abrasiveness of the innermost ends of the deflection modifying members 90 may also be employed without departing from the scope of the present disclosure.

As in the embodiments of FIGS. 8-13, various means for adjusting the toe angle may be incorporated into the embodiment of FIGS. 16-18. For example, a shim or spacer may be positioned between the longitudinal leg 82 of a bracket 78 and the associated steering knuckle 74 to increase the toe angle. Other means for setting the toe angle may also be employed without departing from the scope of the present disclosure.

Figure 19:
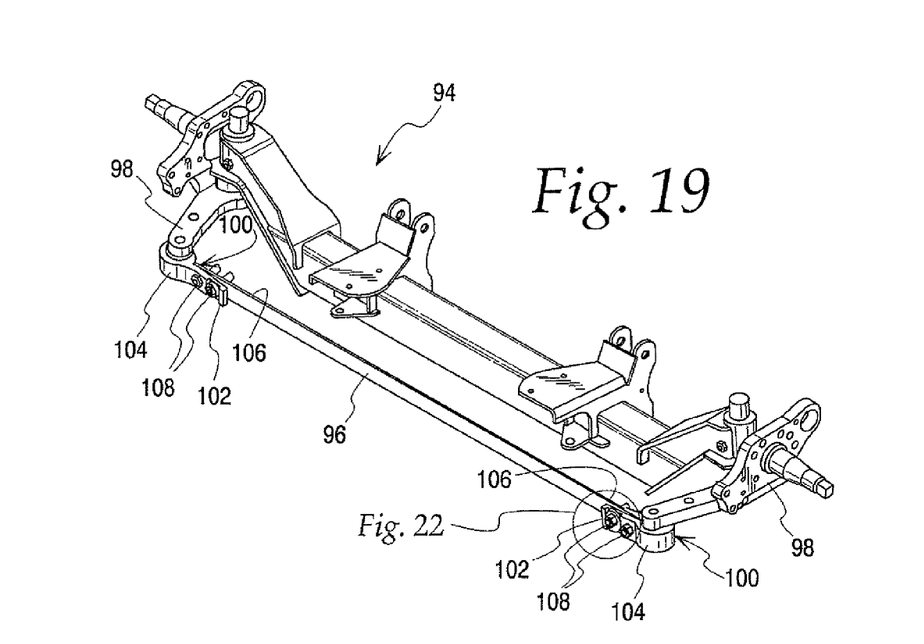
FIG. 19 is a top perspective view of another alternative steering axle assembly, with the steering knuckles of the axle assembly in a centered or non-rotated configuration.
Figure 20:
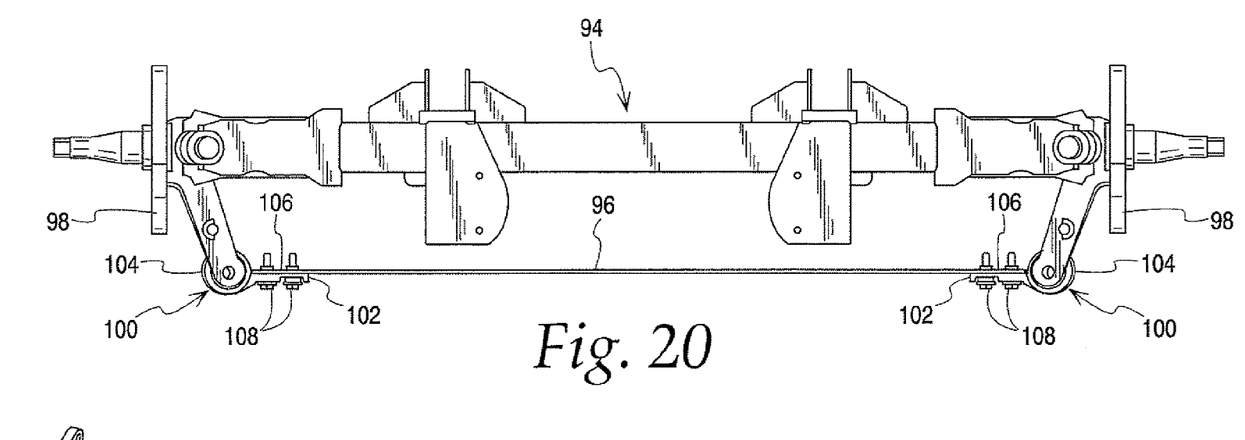
FIG. 20 is a top plan view of the axle assembly of FIG. 19.
Figure 21:
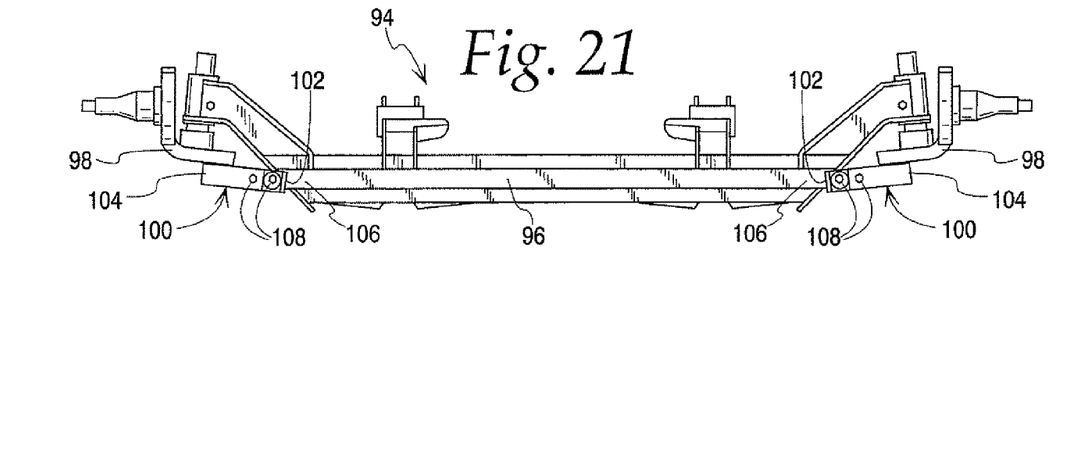
FIG. 21 is a rear elevational view of the axle assembly of FIG. 19.

While the foregoing embodiments relate to steering axle assemblies having a resilient tie rod rigidly secured to a steering knuckle, it is also possible to connect a resilient tie rod to a steering knuckle by rotatable or pivotal means. For example, FIGS. 19-21 illustrate a steering axle assembly 94 incorporating a resilient tie rod 96 that is rotatably or pivotally secured to a pair of steering knuckles 98 by a pair of resilient connectors, such as bushings 100, that act as torsional connection points.

Figure 22:
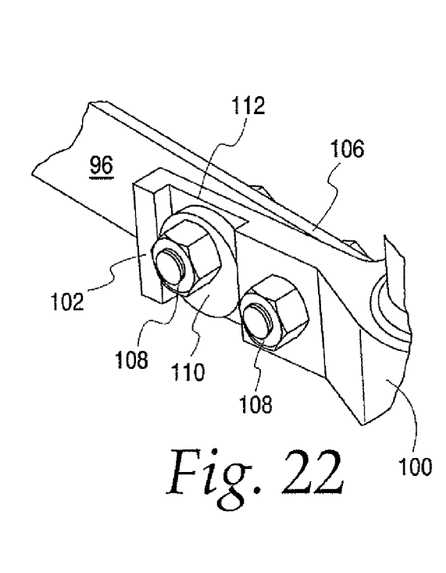
FIG. 22 is a detail view of one end of the tie rod of the axle assembly of FIG. 19.

Each bushing 100 comprises a shank portion 102 and an annular collar portion 104. The shank portions 102 are secured at or adjacent to the ends 106 of the tie rod 96 by mechanical fasteners 108 or other known means. FIG. 22 is a detail view of a suitable means for both securing the shank portion 102 of a bushing 100 to an end 106 of the tie rod 96 and adjusting the toe angle of the steering knuckles 98. One or both of the bushings 100 may be secured to the tie rod 96 by the illustrated means.

The shank portion 102 illustrated in FIG. 22 is secured to the tie rod 96 by a pair of mechanical fasteners 108, with one of the fasteners 108 locking an eccentric disk 110 in place within a groove 112 of the shank portion 102. The disk 110 is substantially circular, but the associated fastener 108 passes through an aperture in the disk 110 that is offset from the center of the disk 110. The width of the groove 112 may be substantially equal to the diameter of the disk 110, such that the perimeter of the disk 110 bears against the lateral walls of the groove 112 and effectively determines the lateral positioning of the groove 112 and, hence, the bushing 100. Loosening the fastener 108 allows the disk 110 to be rotated about the off-center fastener 108, thereby shifting the lateral position of the perimeter of the disk 110, which adjusts the lateral position of the bushing 100 with respect to the tie rod 96. When the desired orientation of the disk 110 has been achieved, the fastener 108 may be tightened to hold the disk 110 in place. So adjusting the lateral position of the bushing 100 with respect to the tie rod 96 adjusts the effective length of the tie rod 96, thereby increasing the toe angle of the steering knuckles 98 (by decreasing the effective length of the tie rod 96) or decreasing the toe angle (by increasing the effective length of the tie rod 96). Eccentric disks may also be employed as combination securing and toe angle-adjusting means with other steering axle assemblies according to the present disclosure.

Figure 23:
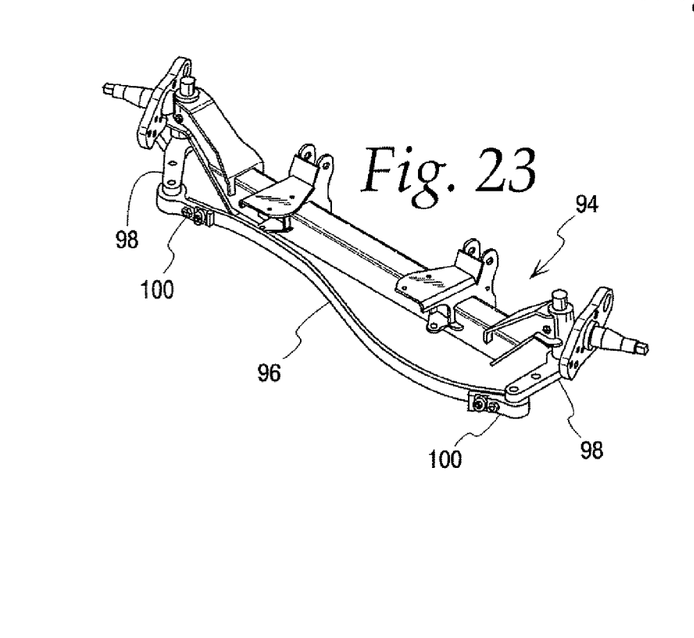
FIG. 23 is a top perspective view of the axle assembly of FIG. 19, with the steering knuckles of the axle assembly in a rotated configuration.
Figure 24:
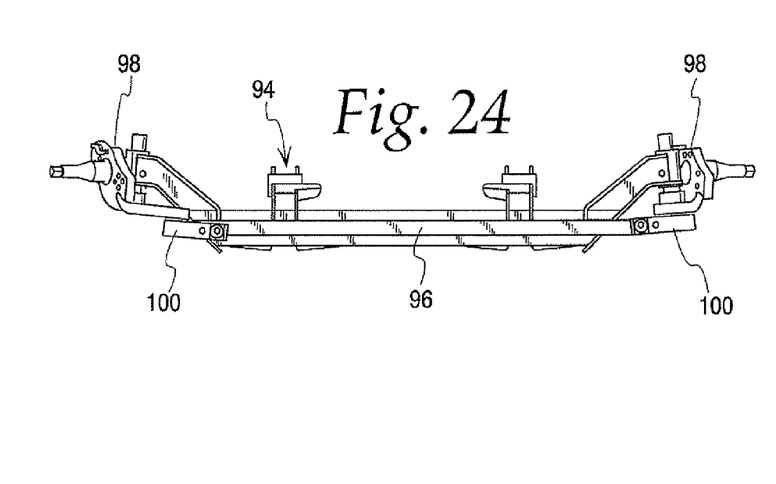
FIG. 24 is a rear elevational view of the axle assembly of FIG. 19, with the steering knuckles of the axle assembly in a rotated configuration.

As for the collar portions 104 of the bushings 100, each is rotatably or pivotally associated with a steering knuckle 98, for example by a pivot in accordance with the pivot mounted in the aperture D of the tie rod arm B of FIG. 5. The bushings 100, and the collar portions 104 in particular, are at least partially comprised of a resilient material, such as rubber or similar elastomeric material so, rather than pivoting freely, they will resist pivoting to some degree when the steering knuckles 98 are moved from a centered configuration (FIGS. 19-21) to a rotated configuration (FIGS. 23 and 24). Depending on the amount of resistance, the tie rod 96 may achieve an "S-shaped" configuration when the steering knuckles 98 are in a non-centered condition, as shown in FIGS. 23 and 24. Such an "S-shaped" configuration may be beneficial for the same reasons described above with regard to the other compliant tie rods of the present disclosure.

Figures 25, 27:
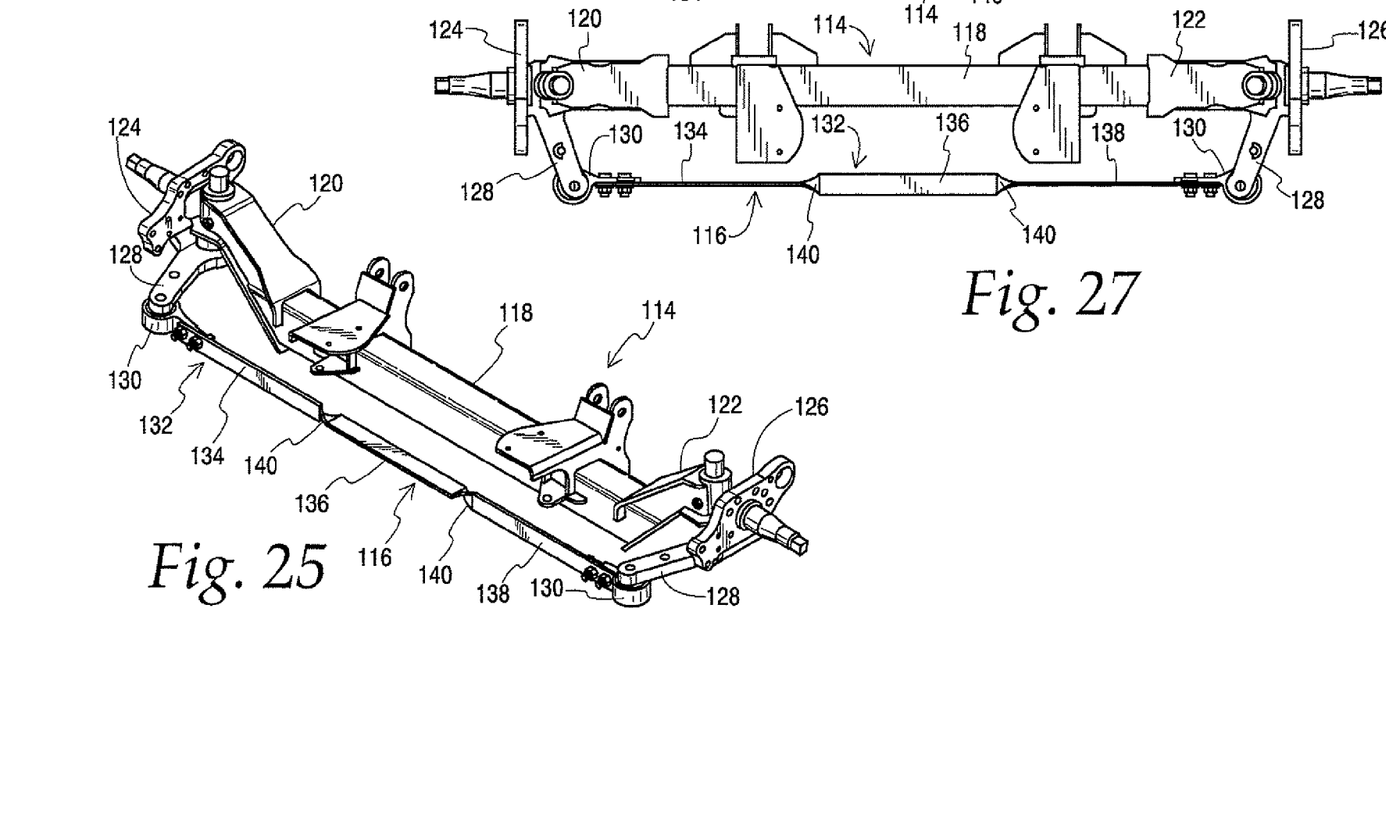
FIG. 25 is a top perspective view of another alternative steering axle assembly, with the steering knuckles of the axle assembly in a centered or non-rotated configuration.
FIG. 27 is a top plan view of the axle assembly of FIG. 25.
Figure 26:
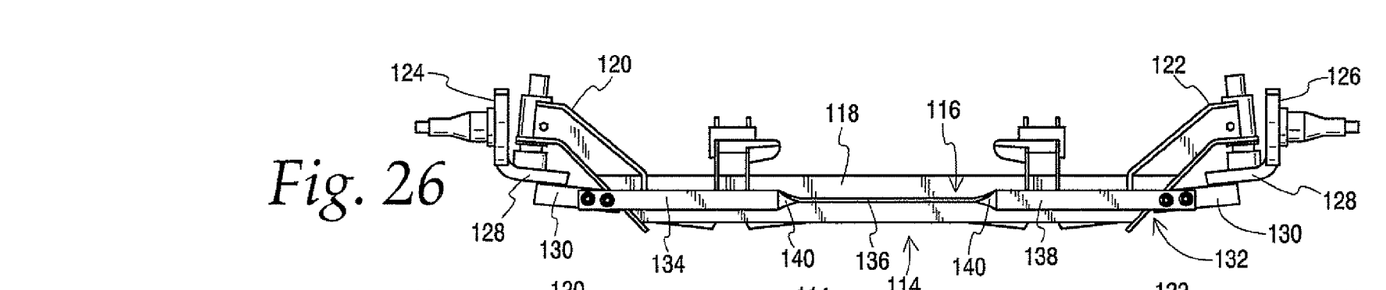
FIG. 26 is a rear elevational view of the axle assembly of FIG. 25.

FIGS. 25-27 illustrate an axle assembly 114 incorporating another alternative tie rod 116. The axle assembly 114 is similar to the one illustrated in FIGS. 19-24 and described above with reference to FIGS. 19-24. Briefly, the axle assembly 114 includes an axle 118 having a first end 120 and a second end 122. A first steering knuckle 124 is rotatably associated with the first end 120 of the axle 118, while a second steering knuckle 126 is rotatably associated with the second end 122 of the axle 118. FIGS. 25-27 show the steering knuckles 124 and 126 in a centered or non-rotated configuration for straight ahead driving, while it will be understood that the steering knuckles 124 and 126 can also be moved to a rotated configuration for turning.

Each steering knuckle 124, 126 is shown with a tie rod arm 128 and an associated connector or bushing 130 according to the foregoing description of the embodiment of FIGS. 19-24.

Alternatively, the tie rod 116 of FIGS. 25-27 may be directly secured (either rotatably or non-rotatably) to the steering knuckles 124 and 126 without departing from the scope of the present disclosure.

In contrast to the tie rods describe above, the tie rod 116 of FIGS. 25-27 has a generally linear portion 132 (i.e., a portion which is substantially parallel to the axle 118 when the axle assembly 114 is fully assembled and the steering knuckles 124 and 126 are in the centered configuration of FIGS. 25-27) with regions that are inclined with respect to each other. The differently oriented regions of the tie rod 116 reduce the overall stress in the tie rod 116 as the steering knuckles 124 and 126 are turned away from the centered configuration of FIGS. 25-27. The differently oriented regions also improve performance of the tie rod 116 during vertical impacts.

In the illustrated embodiment, the linear portion 132 of the tie rod 116 includes a first region 134, a second region 136, and a third region 138. Although the tie rod 116 shown in FIGS. 25-27 includes three regions, it is not required to have exactly three regions and may alternatively include either two regions or more than three regions without departing from the scope of the present disclosure.

The first and third regions 134 and 138 of FIGS. 25-27 correspond to the ends or outer portions of the tie rod 116, while the second region 136 is positioned intermediate the first and third regions 134 and 138. The various regions of the tie rod 116 have a non-circular cross-section, which is shown in FIGS. 25-27 as a rectangular cross-section. The first and third regions 134 and 138 shown in FIGS. 25-27 are configured to be substantially vertical (i.e., with their longest cross-sectional dimension extending vertically) when the tie rod 116 is associated with the remainder of the axle assembly 114. The second region 136 is configured to be substantially horizontal (i.e., with its longest cross-sectional dimension extending horizontally) when the tie rod 116 is associated with the remainder of the axle assembly 114. Hence, the first and third regions 134 and 138 shown in FIGS. 25-27 are substantially aligned with each other, while the second region 136 is inclined with (particularly perpendicular to) the first and third regions 134 and 138. Other inclination angles between the regions may also be employed without departing from the scope of the present disclosure.

In the embodiment of FIGS. 25-27, the tie rod 116 is unitarily formed. To allow the tie rod 116 to have differently oriented regions while also being unitarily formed, transitions are provided between the different regions. In the illustrated embodiment, the tie rod 116 includes twisted regions 140 positioned between the second region 136 and each of the first and third regions 134 and 138. The twisted regions 140 provide a smooth transition between the adjacent, inclined regions. Other methods of inclining one region with respect to another region (e.g., forming the various regions separately and securing them to each other) may also be employed without departing from the scope of the present disclosure.

As in the above-described tie rods, the tie rod 116 of FIGS. 25-27 may be comprised of a substantially resilient material. Further, the tie rod 116 may be provided with longitudinally extending sections (similar to the sections 44 of the tie rod 42 shown in FIGS. 8-11 or the legs 82 of FIGS. 16-18) at either end of the generally linear portion 132 to connect the tie rod 116 to the steering knuckles 124 and 126.

Figures 28, 29, 29A, 30:
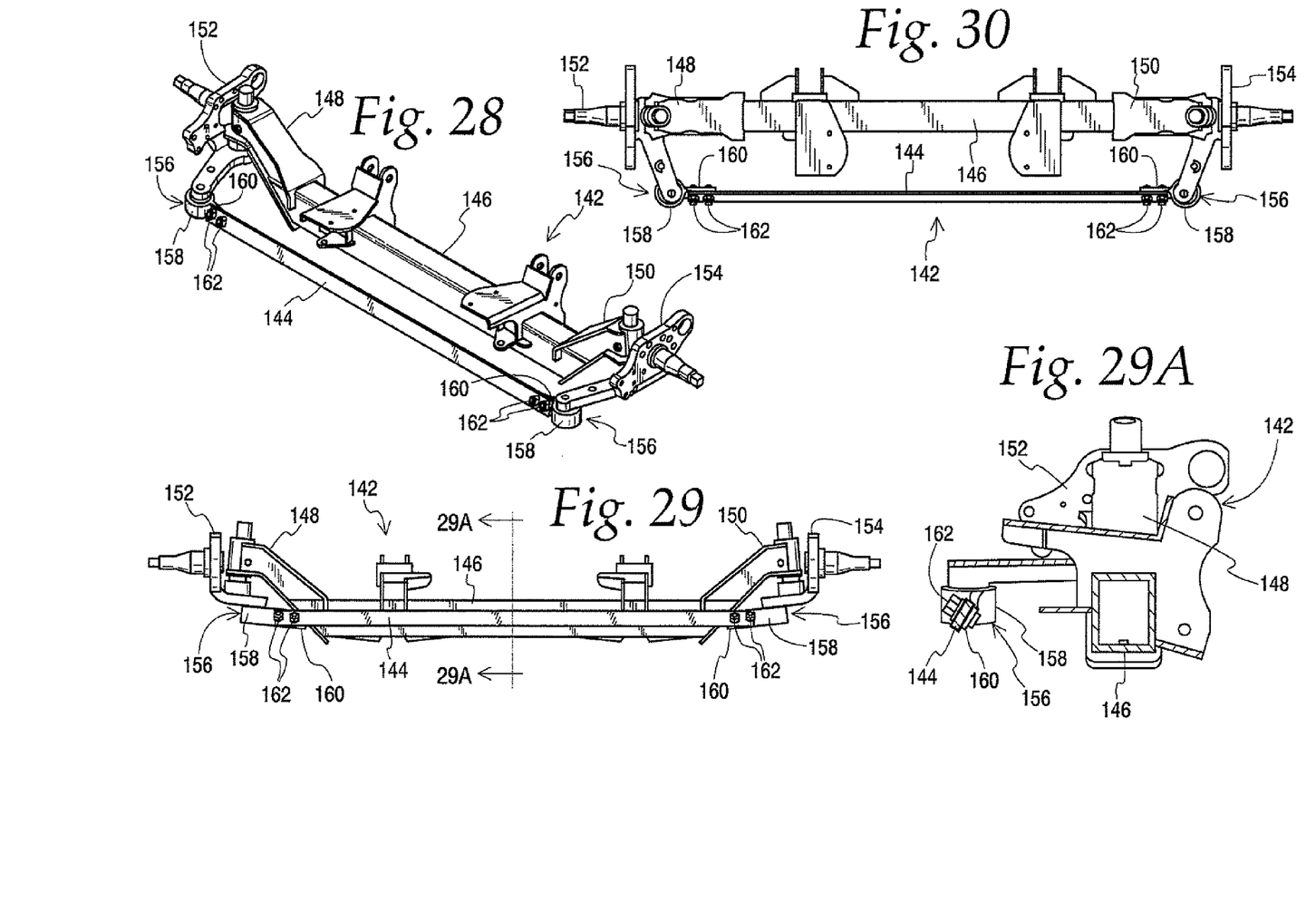
FIG. 28 is a top perspective view of another alternative steering axle assembly, with the steering knuckles of the axle assembly in a centered or non-rotated configuration.
FIG. 29 is a rear elevational view of the axle assembly of FIG. 28.
FIG. 29A is a cross-sectional view of the axle assembly of FIG. 28, taken through the line 29A-29A of FIG. 29.
FIG. 30 is a top plan view of the axle assembly of FIG. 28.

FIGS. 28-30 illustrate an axle assembly 142 incorporating yet another alternative tie rod 144. As in the axle assembly 114 of FIGS. 25-27, the axle assembly 142 includes an axle 146 having a first end 148 and a second end 150, with a first steering knuckle 152 being rotatably associated with the first end 148 of the axle 146 and a second steering knuckle 154 being rotatably associated with the second end 150 of the axle 146.

In the embodiment of FIGS. 28-30, a connector or bushing 156 (which will be described in greater detail herein) is associated with each steering knuckle 152, 154. for connecting the tie rod 144 to the remainder of the axle assembly 142. The tie rod 144 may instead be otherwise secured (either directly, indirectly, rotatably, or non-rotatably) to the steering knuckles 152 and 154 without departing from the scope of the present disclosure.

As for the tie rod 144, it extends between the steering knuckles 152 and 154 and has a non-circular cross-section, which is shown in FIGS. 28-30 as a rectangular cross-section. As best illustrated in FIG. 29A, the tie rod 144 is oriented in an inclined configuration (i.e., inclined with respect to both a vertical direction and a horizontal direction) when associated with the remainder of the axle assembly 142. The tie rod 144 shown in FIGS. 28-30 is inclined at an angle of approximately 30° from vertical, but other inclination angles may also be employed without departing from the scope of the present disclosure.

In the embodiment of FIGS. 28-30, the axle assembly 142 includes connectors 156 which are similar to the bushings 100 illustrated in FIGS. 19-24 and described above. In particular, each connector 156 comprises an annular collar portion 158 and a shank portion 160. The collar portions 158 of the connectors 156 are each rotatably or pivotally associated with a steering knuckle 152, 154. The connectors 156, and the collar portions 158 in particular, may be at least partially comprised of a resilient material, as described above with regard to the bushings 100 illustrated in FIGS. 19-24.

The ends of the tie rod 144 are secured to the shank portions 160 by mechanical fasteners 162 or other known means. The tie rod 144 of FIGS. 28-30 is a metallic bar, so its orientation is determined by the manner in which it is associated with the remainder of the axle assembly 142. In the illustrated embodiment, the shank portions 160 of the connectors 156 are themselves inclined to dictate the inclination angle of the tie rod 144. Other methods of orienting the tie rod 144 in an inclined configuration (e.g., by directly securing the ends of the tie rod 144 to the steering knuckles 152 and 154 at an angle with respect to both vertical and horizontal direction) may also be employed without departing from the scope of the present disclosure.

As in the above-described tie rods, the tie rod 144 of FIGS. 25-27 may be comprised of a substantially resilient material. If the tie rod 144 is resilient, then orienting it at an inclined configuration will reduce the overall stress it experiences as the steering knuckles 152 and 154 are rotated and it moves into an "S-shaped" configuration (similar to the one shown in FIG. 4 and described above). This is particularly advantageous when the tie rod 144 is non-rotatably secured to the steering knuckles 152 and 154. Other advantages include a reduction in stress when the tie rod 144 experiences a vertical impact.

While this invention has been described with reference to certain illustrative aspects, it will be understood that this description shall not be construed in a limiting sense. Rather, various changes and modifications can be made to the illustrative embodiments without departing from the true spirit and scope of the invention. Furthermore, it will be appreciated that any such changes and modifications will be recognized by those skilled in the art as an equivalent to the subject matter disclosed herein.

The invention claimed is:

1. A tie rod for use in a vehicle axle assembly having an axle with first and second ends and a pair of steering knuckles rotatably associated with the first and second ends of the axle, wherein the tie rod is adapted to be secured to the steering knuckles, is comprised of a substantially resilient material configured to bend when the steering knuckles are rotated away from a centered configuration, has a non-circular cross-section, and is adapted to bias the steering knuckles to a centered configuration upon rotation of at least one of the steering knuckles away from the centered configuration.

2. The tie rod of claim 1, wherein the tie rod has a substantially rectangular cross-section.

3. The tie rod of claim 1, wherein the tie rod is comprised of a material selected from the group consisting of aircraft grade aluminum material, spring steel material, and composite spring material.

4. The tie rod of claim 1, wherein the cross-section of the tie rod has different bending strengths in different directions.

5. The tie rod of claim 1, wherein the tie rod is configured to bend in only one plane.

6. A tie rod for use in a vehicle axle assembly having an axle with first and second ends and a pair of steering knuckles rotatably associated with the first and second ends of the axle, wherein the tie rod
   is adapted to be secured to the steering knuckles,
   is comprised of a substantially resilient material, has a non-circular cross-section, and
   is adapted to assume a generally S-shaped configuration upon rotation of at least one of the steering knuckles away from a centered configuration.

7. The tie rod of claim 6, wherein the tie rod is adapted to contact the axle upon sufficient rotation of at least one of the steering knuckles away from the centered configuration.

8. The tie rod of claim 7, wherein the steering knuckles are adapted to be in an optimized Ackerman steering configuration or a substantially optimized Ackerman steering configuration when the tie rod is in contact with the axle.

9. An axle assembly for a vehicle, comprising:
   an axle having first and second ends;
   a first steering knuckle rotatably associated with the first end of the axle and having a first aperture receiving a first pivot;
   a second steering knuckle rotatably associated with the second end of the axle and having a second aperture receiving a second pivot;
   a first connector including a first shank portion and a first annular collar portion, the first annular collar portion being at least partially comprised of a resilient material and receiving the first pivot;
   a second connector including a second shank portion and a second annular collar portion, the second annular collar portion being at least partially comprised of a resilient material and receiving the second pivot; and
   a tie rod extending between the first and second connectors, wherein the tie rod is comprised of a substantially resilient material, adapted to bias the steering knuckles to a centered configuration upon rotation of at least one of the steering knuckles away from the centered configuration, and is connected to the first and second shank portions.

10. The axle assembly of claim 9, wherein the tie rod has a non-circular cross-section.

11. The axle assembly of claim 10, wherein the tie rod has a substantially rectangular cross-section.

12. The axle assembly of claim 9, wherein the tie rod is comprised of a material selected from the group consisting of aircraft grade aluminum material, spring steel material, and composite spring material.

13. The axle assembly of claim 9, wherein the connectors are rotatably associated with the steering knuckles.

14. The axle assembly of claim 13, wherein the connectors resist rotating with respect to the steering knuckles.

15. The axle assembly of claim 9, wherein at least a portion of each bushing is comprised of an elastomeric material.

16. The axle assembly of claim 9, wherein at least a portion of each bushing is comprised of a rubber material.

17. The axle assembly of claim 9, wherein the tie rod has a cross-section with different bending strengths in different directions.

18. The axle assembly of claim 9, wherein the tie rod is configured to bend in only one plane.

19. An axle assembly for a vehicle, comprising:
   an axle having first and second ends;
   a first steering knuckle rotatably associated with the first end of the axle;
   a second steering knuckle rotatably associated with the second end of the axle;
   a first connector associated with the first steering knuckle and at least partially comprised of a resilient material;
   a second connector associated with the second steering knuckle and at least partially comprised of a resilient material; and
   a tie rod extending between the first and second connectors, wherein the tie rod is comprised of a substantially resilient material and is adapted to assume a generally S-shaped configuration upon rotation of at least one of the steering knuckles away from a centered configuration.

20. An axle assembly for a vehicle, comprising:
   an axle having first and second ends;
   a first steering knuckle rotatably associated with the first end of the axle;
   a second steering knuckle rotatably associated with the second end of the axle;
   a first connector associated with the first steering knuckle and at least partially comprised of a resilient material;
   a second connector associated with the second steering knuckle and at least partially comprised of a resilient material;
   a tie rod extending between the first and second connectors, wherein the tie rod is comprised of a substantially resilient material; and
   a groove defined in one of the connectors and an eccentric disk at least partially received by the groove, wherein the disk is adapted to be rotated for adjusting the position of the associated connector with respect to the tie rod.

* * * * *